United States Patent
West

(10) Patent No.: US 11,319,710 B2
(45) Date of Patent: May 3, 2022

(54) PLASTER COMPOSITION COMPRISING HYDROPHILIC FUMED SILICA AND AEROSOL COMPOSITION COMPRISING THE PLASTER COMPOSITION

(71) Applicant: Richard A. West, Lakewood, OH (US)

(72) Inventor: Richard A. West, Lakewood, OH (US)

(*) Notice: Subject to any disclaimer, the term of this patent is extended or adjusted under 35 U.S.C. 154(b) by 0 days.

(21) Appl. No.: 16/815,111

(22) Filed: Mar. 11, 2020

(65) Prior Publication Data

US 2020/0291658 A1   Sep. 17, 2020

Related U.S. Application Data

(60) Provisional application No. 62/816,322, filed on Mar. 11, 2019.

(51) Int. Cl.
  *C04B 14/04*   (2006.01)
  *E04F 13/04*   (2006.01)
  *C04B 14/30*   (2006.01)
  *C04B 14/36*   (2006.01)
  *C04B 14/28*   (2006.01)

(52) U.S. Cl.
  CPC .............. *E04F 13/04* (2013.01); *C04B 14/04* (2013.01); *C04B 14/28* (2013.01); *C04B 14/305* (2013.01); *C04B 14/365* (2013.01)

(58) Field of Classification Search
  CPC ...................................................... C04B 14/06
  See application file for complete search history.

(56) References Cited

U.S. PATENT DOCUMENTS

| | | | | |
|---|---|---|---|---|
| 4,238,239 A | * | 12/1980 | Brown | C04B 28/14 106/778 |
| 6,238,476 B1 | * | 5/2001 | Sprinkle | C04B 26/04 106/645 |
| 2014/0249256 A1 | * | 9/2014 | Kordosh | C08K 3/26 524/108 |

* cited by examiner

*Primary Examiner* — Hoa (Holly) Le
(74) *Attorney, Agent, or Firm* — Fay Sharpe LLP

(57) ABSTRACT

A plaster composition includes a joint compound/drywall mud and from about 0.5 wt % to about 10 wt % silica (e.g., hydrophilic fumed silica). The plaster composition may be a repair composition. The repair composition may be dispensed as an aerosol using a propellant. The repair composition may be useful for repairing "popcorn" textured ceilings.

19 Claims, 3 Drawing Sheets

100

FORM PLASTER REPAIR COMPOSITION
110

PROVIDE PLASTER REPAIR COMPOSITION TO OPEN CONTAINER
120

CLOSE CONTAINER
130

PROVIDE PROPELLANT TO CONTAINER
140

AGITATE CONTAINER TO MIX CONTENTS
150

PLASTER COMPOSITION COMPRISING HYDROPHILIC FUMED SILICA AND AEROSOL COMPOSITION COMPRISING THE PLASTER COMPOSITION

The present application claims the priority benefit of U.S. Provisional Patent Application Ser. No. 62/816,322, filed Mar. 11, 2019, the disclosure of which is incorporated herein by reference.

BACKGROUND

Textured ceilings are challenging to repair. The present disclosure relates to a plaster composition which may be a repair composition. The composition may be useful for repairing "popcorn" textured ceilings. However, the composition may also be useful for repairing other surfaces/articles and may further be useful for purposes other than repair. The composition may be dispensed as a spray (e.g., from an aerosol can which also contains a propellant gas).

BRIEF DESCRIPTION

Disclosed, in some embodiments, is a plaster composition containing a joint compound/drywall mud and from about 0.5 wt % to about 10 wt % of silica (e.g., hydrophilic fumed silica). Optionally, the composition further includes a colorant (e.g., $TiO_2$) and/or water.

In particular embodiments, the composition contains about 92.3 wt % joint compound/drywall mud, about 2.5 wt % silica (e.g., hydrophilic fumed silica), about 3.0 wt % titanium dioxide, and/or about 2.2 wt % water.

A propellant can be added to form a sprayable, aerosol composition.

Methods for repairing surfaces (e.g., textured ceilings) are also disclosed. The methods include dispensing the aerosol composition onto a damaged surface.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIGS. 3-5 show details of a known aerosol spray container.

FIG. 6 is a cut-away view of a container top with a toggle valve in accordance with some embodiments of the present disclosure.

DETAILED DESCRIPTION

Figure 1:
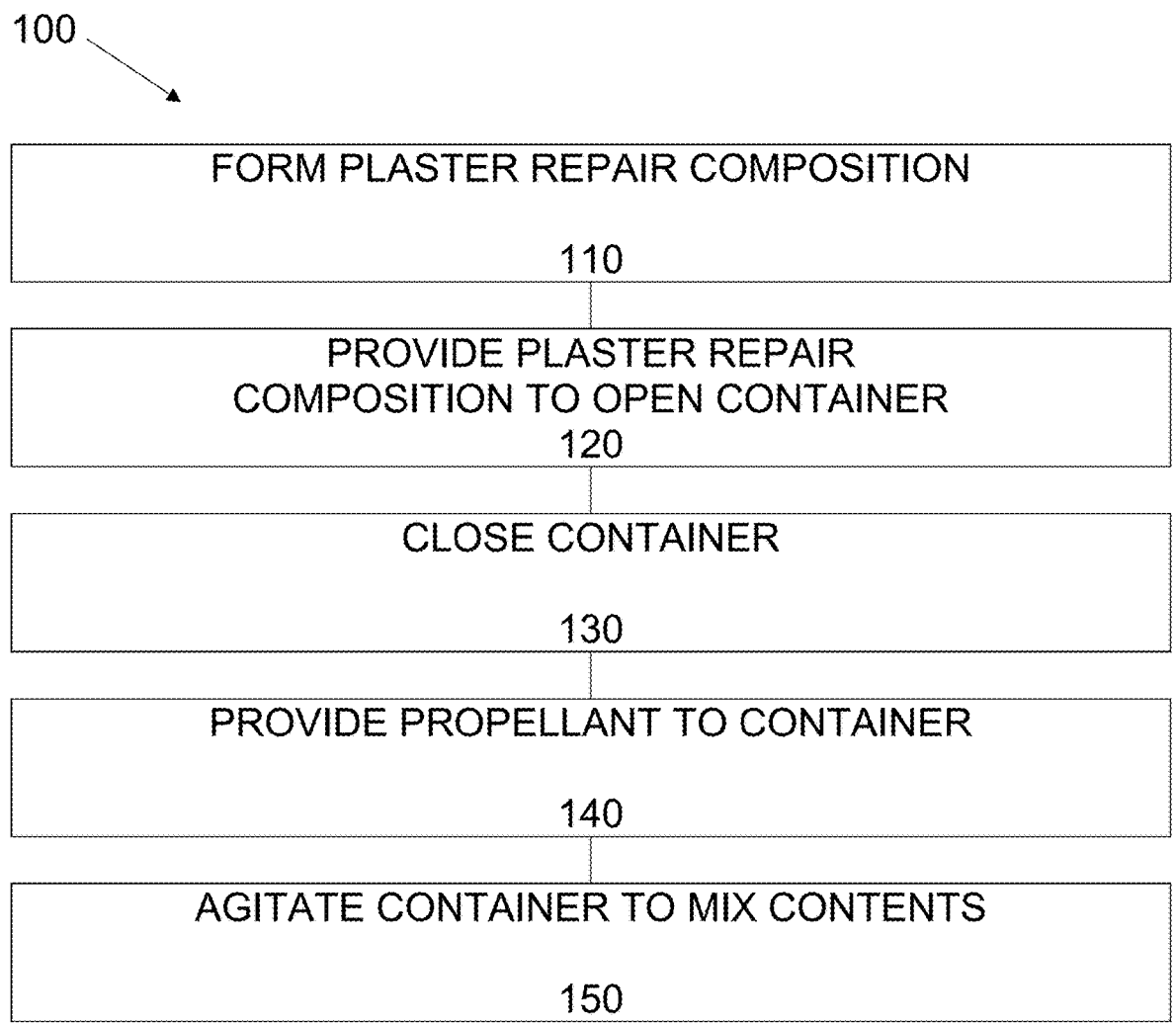
FIG. 1 is a flow chart illustrating a non-limiting example of a method for producing an aerosol plaster repair product in accordance with some embodiments of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable.

In some aerosol embodiments, a plaster repair formulation is prepared and introduced into an open top container, the filled container is closed with a cap having a valve, a propellant is introduced into the closed container, the propellant is intermixed with the plaster repair formulation in the closed container, and the plaster repair formulation is selectively dispensed from the pressurized container through the valve.

In some embodiments, the formulation generally includes a joint compound or drywall mud, silica (e.g., hydrophilic fumed silica), colorant(s), and water.

The formulation may be dispensed from a pressurized can with a trigger/straw valve or through an actuator (spray tip) and sprayed. The propellant may be a gas (at room temperature and normal, ambient atmospheric pressure) and may liquefy when under a predetermined pressure.

The process of manufacturing an aerosol product may include: mixing the plaster repair formulation (e.g., utilizing high speed dispersion equipment, low speed dual planetary mixer with vacuum capabilities, and/or ribbon style blender); pouring the plaster repair formulation into an open top container such as a metal container (12 ounce can and larger, for example); optionally releasing a layer of an inert gas such as nitrogen gas into the open container/can to dispense room air; capping or closing the metal container/can with a valve; inject the propellant into the container/can through the valve; pressurizing the container/can with a propellant to an elevated pressure above ambient; and shaking the container/can to mix the liquefied propellant into the plaster repair formulation.

The closed or sealed container/can then holds the intermixed liquefied propellant in the plaster repair formulation until a user or consumer desires to selectively dispense the formulation by opening the valve via a valve actuator (actuating a trigger, handle, push button, or the like). By releasing the valve actuator and closing the valve, the remaining contents of the intermixed propellant/plaster repair formulation remain pressurized in the container/can until required.

Plaster repair formulations are described in the tables below. The materials listed in these tables may be combined and/or mixed in various orders. In some embodiments, different portions of the same material are added add different stages of the mixing process. This may be done in order to control viscosity during the mixing, allow for a desired dispersion materials, etc.

In some embodiments, the propellant is added after the other components have already been loaded into a container (e.g., after the other components have been mixed, added to a can, and the can has been capped with a valve).

The Table below summarizes one type of plaster repair formulation in accordance with some embodiments of the present disclosure.

| Material Type | Non-Limiting Example | First wt % Range | Second wt % Range | Third wt % Range | Example wt % |
|---|---|---|---|---|---|
| Joint Compound/ Drywall Mud | SHEETROCK ® Brand All Purpose Joint Compound, Ready-Mixed from USG | 80-99 | 85-95 | 90-95 | 92.3 |
| Silica | AEROSIL ® 300 from Evonik (hydrophilic fumed silica) | 0.5-10 | 1-4 | 2-3 | 2.5 |
| Colorant | TiO$_2$ | 0-10 | 1-5 | 2-4 | 3.0 |
| Water | | 0-10 | 1-5 | 2-4 | 2.2 |

Water may be added to improve flow properties and prevent valve blockage.

SHEETROCK® Brand All Purpose Joint Compound contains greater than 65 wt % limestone (CAS No. 1317-65-3; major materials: calcite and aragonite, which are different crystal forms of calcium carbonate), less than 3 wt % talc (CAS No. 14807-96-6; a hydrated magnesium silicate), less than 5 wt % attapulgite (CAS No. 12174-11-7; a magnesium aluminum phyllosilicate), less than 5 wt % mica (CAS No. 12001-26-2, a magnesium aluminum phyllosilicate), less than 5 wt % perlite (CAS No. 93763-70-3, an amorphous volcanic glass), less than 5 wt % quartz (sand) (CAS No. 14808-60-7), and less than 2 wt % kaolin (CAS No. 1332-58-7, a layered silicate material). However, other joint compounds and drywall muds can also be used.

In some embodiments, the joint compound or drywall mud comprises, consists essentially of, or consists of powdered gypsum (calcium sulfate) and optionally water. Gypsum may be constitute a majority of the joint compound or drywall mud by weight.

In some embodiments, the joint compound or drywall mud comprises, consists essentially of, or consists of powdered limestone (calcium carbonate) and optionally water. Calcium carbonate may be constitute a majority of the joint compound or drywall mud by weight.

In some embodiments, the joint compound or drywall mud comprises a mixture of powdered gypsum and limestone.

In some embodiments, the joint compound or drywall mud is as described in expired U.S. Pat. No. 499,710, which is incorporated by reference herein in its entirety.

In some embodiments, the joint compound or drywall mud is as described in expired U.S. Pat. No. 816,532, which is incorporated by reference herein in its entirety.

In some embodiments, the joint compound or drywall mud is as described in expired U.S. Pat. No. 903,017, which is incorporated by reference herein in its entirety.

In some embodiments, the joint compound or drywall mud is as described in expired U.S. Pat. No. 2,820,714, which is incorporated by reference herein in its entirety.

In some embodiments, the joint compound or drywall mud is as described in expired U.S. Pat. No. 3,892,453, which is incorporated by reference herein in its entirety.

In some embodiments, the joint compound or drywall mud is as described in expired U.S. Pat. No. 4,287,103, which is incorporated by reference herein in its entirety.

In some embodiments, the joint compound or drywall mud is as described in expired U.S. Pat. No. 5,661,211, which is incorporated by reference herein in its entirety.

In some embodiments, the joint compound or drywall mud contains from about 30 wt % to about 85 wt % calcium carbonate and/or gypsum, and about 5 wt % to about 50 wt % water.

The silica may be amorphous silica. In some embodiments, the silica is characterized by having a crystallinity below 0.05 percent by weight measured by X-ray diffraction.

The silica may be treated with a wet-chemical process (e.g., precipitated silicas, silica gels, and colloidal silica) or a fumed/thermal process (e.g., fumed silicas). The fumed/thermal process may include one or more of an electric arc treatment, a flame hydrolysis treatment, and a plasma treatment.

The silica may be characterized by one or more of the following properties:
specific surface area (BET) (ISO 9277): about 50 to about 500 m$^2$/g;
mean primary particle size (nm) about 5 to about 50 nm;
aggregate or agglomerate size: strongly dependent on dispersion conditions but granulates of about 20 to about 30 micrometers in some embodiments;
tamped density (ISO 787/11) about 50 to about 250 g/L;
loss on drying (ISO 787/2): less than or equal to about 3%;
loss on ignition (ISO 3262/20): about 3.5 to about 5.5%;
pH value (ISO 787/9): about 3 to about 5;
non-porous;
dioctyl adipate absorption (ISO CD 19246): about 200 to about 350 mL per 100 grams;
predominantly chain-like, branched, or higher structure of aggregates and agglomerates; and
distinctive thickening effect.

In particular embodiments, the hydrophilic fumed silica has a BET surface area in the range of about 100 to about 400 m$^2$/g, including from about 200 to about 350 m$^2$/g, about 270 to about 330 m$^2$/g, and about 300 m$^2$/g.

In some embodiments, the fumed silica is produced by continuous flame hydrolysis of a substance such as silicon tetrachloride and the following is the overall reaction:

$$2H_2+O_2+SiCl_4 \rightarrow SiO_2+4HCl.$$

The silica may be hydrophilic. In some embodiments, the hydrophilic silica has surface silanol (Si—OH) groups.

In some embodiments, the silica is treated and/or functionalized.

In some embodiments, an inert gas (e.g., nitrogen) is added to the container. The inert gas may be injected through a valve (e.g., after can crimping). The inert gas may be added to the plaster repair composition blend prior to the introduction of the propellant. In particular embodiments, the inert gas is added to the container if the container is not going to be filled/gassed with the propellant right away.

Non-limiting examples of propellants include hydrocarbons (e.g., propane, isobutene, n-butane, a mixture of any two or more of the foregoing), hydrofluorocarbons (e.g., HFC 134, HFC 152), compressed gases (e.g., $CO_2$, air, nitrogen), oxygenated propellants (e.g., dimethyl ether), and blends.

FIG. 1 illustrates a first non-limiting method 100 of producing an aerosol plaster repair product in accordance with some embodiments of the present disclosure. The method 100 includes forming a plaster repair composition 110; providing the plaster repair composition to a container 120; closing the container 130; providing a propellant to the container via a valve 140; and mixing the contents 150. In some embodiments, the valve is included in a closure applied during the closing 130.

Figure 2:
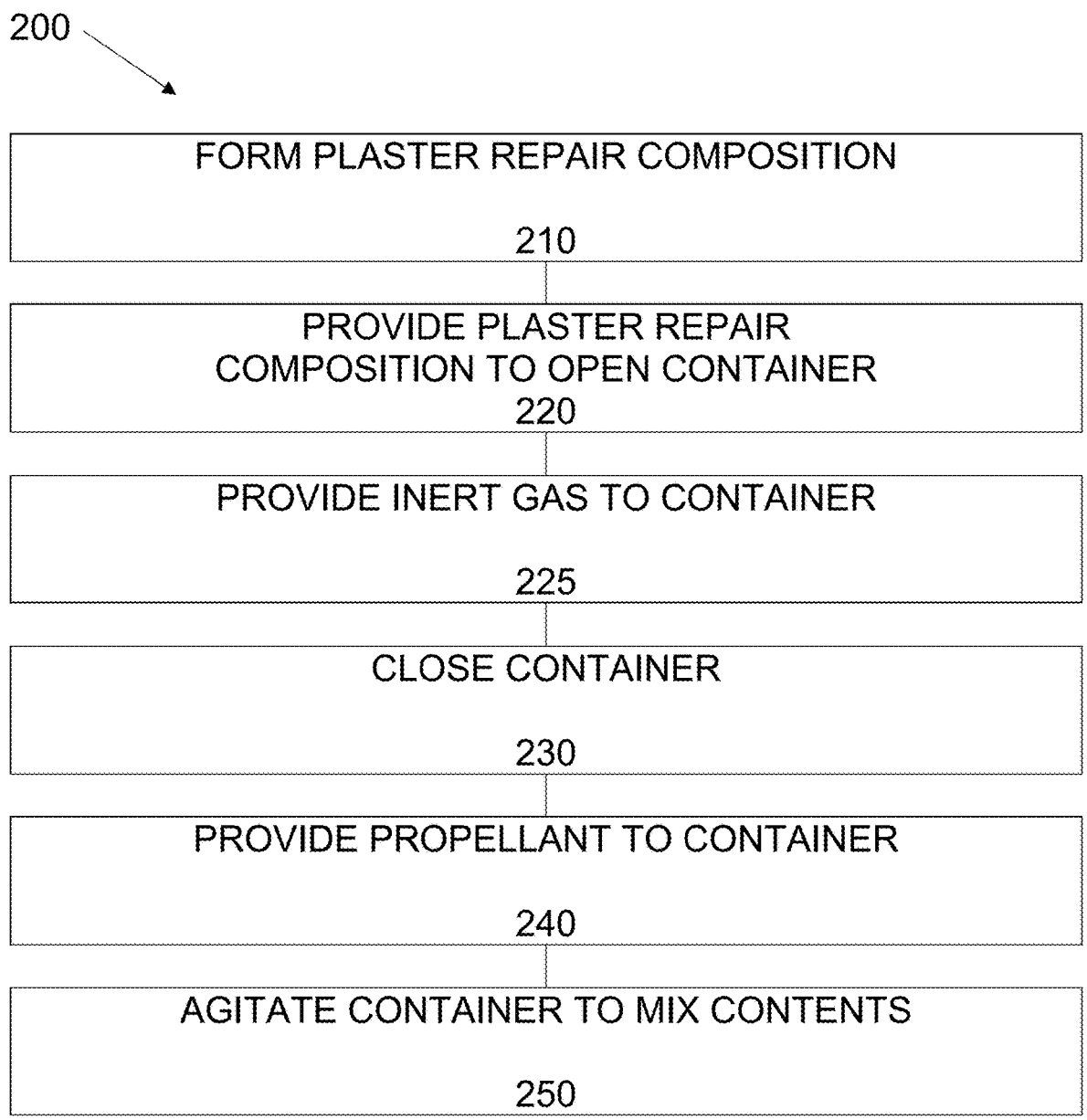
FIG. 2 is a flow chart illustrating a non-limiting example of another method for producing an aerosol plaster repair product in accordance with some embodiments of the present disclosure.

FIG. 2 illustrates a second non-limiting method 200 of producing a plaster repair product in accordance with some embodiments of the present disclosure. The method 200 includes forming a plaster repair composition 210; providing the plaster repair composition to a container 220; providing an inert gas to the container 225; closing the container 230; providing a propellant to the container via a valve 240; and mixing the contents 250. The inert gas may be provided 225 before or after closing the container 230. The inert gas may be provided 225 via the valve.

The composition may be stored in a container including a can and a valve. The can may be made at least partially of steel (e.g., stainless steel) and/or aluminum. Non-limiting examples of cans include 3-piece cans, 3-piece necked-in cans, and 2-piece cans. The 3-piece can may be constructed from a body that starts as a flat sheet and is then rolled and welded into a tube. This forms a seam that runs the vertical length of the can's body. Top and bottom domes may then be seamed onto the body. In the 2-piece configuration, the can wall and upper dome may be formed from the same piece to avoid a side seam.

The container may further include a cover detachably associated with the can and configured to cover the valve when not in use. The cover may, for example, prevent accidental discharge of the composition during transit.

Figure 3:
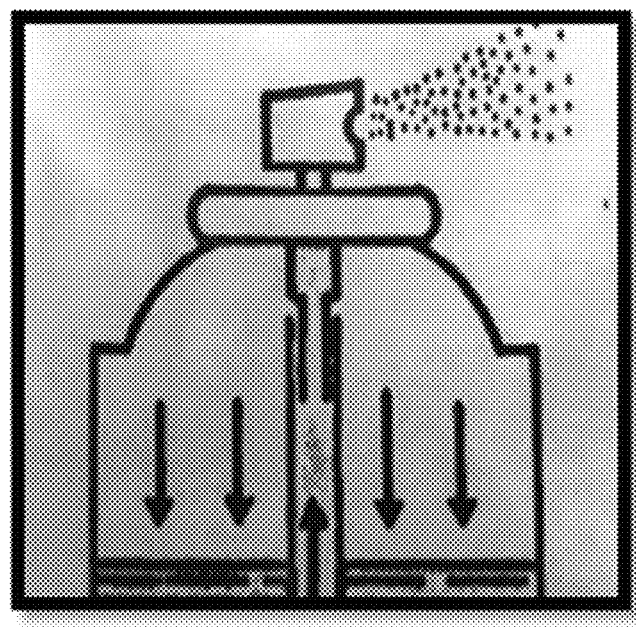
Figure 4:
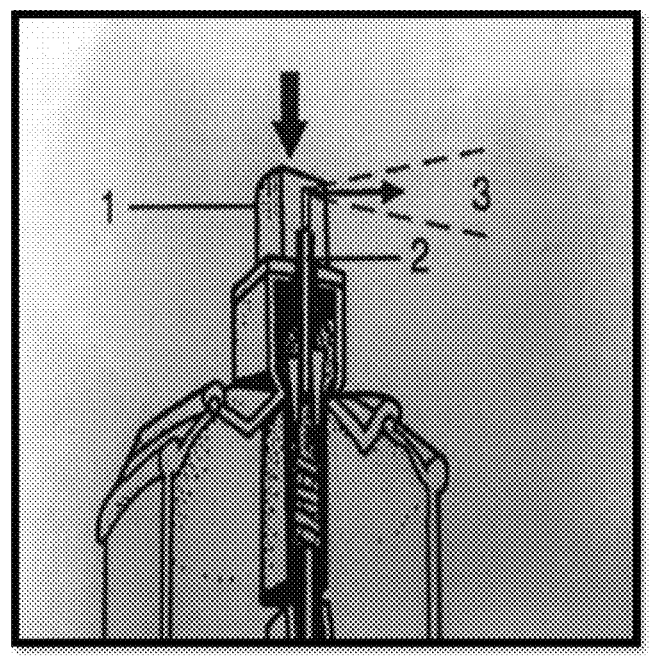

FIGS. 3-5 show a portion of a known aerosol spray container 300 that receives the composition described above. More specifically, known aerosol valve technology uses an actuator/spray nozzle 302 which, when depressed, opens a spring-loaded valve 304 allowing a liquid material to exit the pressurized container or can 300 through the actuator/spray nozzle. The valve 304 returns to a closed position when the actuator/spray nozzle 302 is released due to the returning force imposed by a spring 306. After actuating the valve 304 and spraying the paint through the actuator/spray nozzle 302, and before long term storage of the partially empty container, the container 300 is preferably turned upside down and the actuator/spray nozzle depressed to allow gas propellant to evacuate or clean the actuator/spray nozzle and the valve assembly 304 of residual liquid paint. A seal or gasket 310 that a plunger 312 of the valve 304 rests against prevents propellant and formulation from inadvertently escaping the container 300.

FIG. 6 shows a cut away view of a toggle valve that may be used in a container that receives the composition described above. A toggle valve may use an elastic material (e.g., rubber) to return the valve to its closed position. The normal actuation method includes applying pressure to the side of the stem. Toggle valves are in the closed position until the user applies actuating pressure. Toggle valves can have various different stem configurations. For example, some are smooth and others are threaded for attachment of tips for different applications. In the toggle valve, a rubber seal between the mounting cup and the stem seals off the stem's orifice(s) between uses. The rubber seal also functions as a spring to close the valve when the actuation pressure is removed. The mounting cup may contain aluminum and/or steel (e.g., stainless steel). A gasket may reside between the mounting cup and the can to form a seal.

The following examples are provided to illustrate the devices and methods of the present disclosure. The examples are merely illustrative and are not intended to limit the disclosure to the materials, conditions, or process parameters set forth therein.

EXAMPLES

A plaster repair composition as described in the "Example" column of the Table was produced. An aerosol composition was formed by combining the plaster repair composition with a propellant. The aerosol composition was sprayed onto textured sample substrates with the intention of simulating a repair process.

Different types of silicas were tried to achieve a desired textured surface. However, hydrophilic fumed silica worked best. Other types of silicas clogged the spray tip, laid flat, or yielded a fluffy surface. Hydrophilic fumed silica was able to achieve a variable texture surface, spray without clogging, and seemed to exhibit decreased drying time.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A repair composition comprising:
   a joint compound; and
   hydrophilic fumed silica in an amount of from about 0.5 wt % to about 10 wt % of the repair composition.

2. The repair composition of claim 1, wherein the amount is in the range of about 1 wt % to about 4 wt %.

3. The repair composition of claim 1, wherein the amount is in the range of about 2 wt % to about 3 wt %.

4. The repair composition of claim 1, wherein the amount is about 2.5 wt %.

5. The repair composition of claim 1, wherein the joint compound is present in an amount of from about 80 wt % to about 99 wt %.

6. The repair composition of claim 5, wherein the amount of the joint compound is about 92.3 wt %.

7. The repair composition of claim 1, further comprising: titanium dioxide.

8. The repair composition of claim 7, wherein the titanium dioxide is present in an amount of from about 0.5 wt % to about 10 wt %.

9. The repair composition of claim 8, wherein the amount of titanium dioxide is about 3.0 wt %.

10. The repair composition of claim 1, further comprising: water.

11. The repair composition of claim 10, wherein the water is present in an amount of from about 0.5 wt % to about 10 wt %.

12. The repair composition of claim 11, wherein the water is present in an amount of about 2.2 wt %.

13. The repair composition of claim 1, wherein the hydrophilic fumed silica is present in an amount of from about 2 wt % to about 3 wt % of the repair composition.

14. The repair composition of claim 1, wherein the hydrophilic fumed silica has a BET surface area in a range of about 200 $m^2/g$ to about 350 $m^2/g$.

15. The repair composition of claim 1, wherein the hydrophilic fumed silica has a BET surface area in a range of about 270 $m^2/g$ to about 330 $m^2/g$.

16. An aerosol composition comprising:
a repair composition comprising:
a joint compound; and
hydrophilic fumed silica in an amount of from about 0.5 wt % to about 10 wt % of the repair composition; and
a propellant.

17. The aerosol composition of claim 16, wherein the hydrophilic fumed silica is present in an amount of from about 2 wt % to about 3 wt % of the repair composition.

18. A method for repairing a textured ceiling comprising:
dispensing an aerosol composition on a damaged portion of the textured ceiling, the aerosol composition comprising:
a repair composition comprising:
a joint compound; and
hydrophilic fumed silica in an amount of from about 0.5 wt % to about 10 wt % of the repair composition; and
a propellant.

19. The method of claim 18, wherein the hydrophilic fumed silica is present in an amount of from about 2 wt % to about 3 wt %.

* * * * *